US009629383B2

(12) United States Patent
Higuchi

(10) Patent No.: US 9,629,383 B2
(45) Date of Patent: *Apr. 25, 2017

(54) DRIED PASTA MANUFACTURING METHOD

(75) Inventor: Masahiro Higuchi, Fujimino (JP)

(73) Assignee: NISSHIN FOODS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/005,455

(22) PCT Filed: Mar. 15, 2012

(86) PCT No.: PCT/JP2012/056619
§ 371 (c)(1),
(2), (4) Date: Sep. 16, 2013

(87) PCT Pub. No.: WO2012/124748
PCT Pub. Date: Sep. 20, 2012

(65) Prior Publication Data
US 2014/0010935 A1 Jan. 9, 2014

(30) Foreign Application Priority Data
Mar. 15, 2011 (JP) ................. 2011-056361

(51) Int. Cl.
A23L 1/16 (2006.01)
A23L 1/162 (2006.01)
A23L 7/113 (2016.01)

(52) U.S. Cl.
CPC ............... A23L 1/162 (2013.01); A23L 7/113 (2016.08)

(58) Field of Classification Search
CPC .................................. A23L 7/113; A23L 7/109
USPC ................................................. 426/557, 451
See application file for complete search history.

(56) References Cited

U.S. PATENT DOCUMENTS

| 4,915,966 | A | * | 4/1990 | Guarneri | A23L 1/16 |
| | | | | | 426/451 |
| 5,294,454 | A | | 3/1994 | Guarneri | |
| 5,405,634 | A | | 4/1995 | Manser et al. | |
| 5,456,931 | A | | 10/1995 | Egger et al. | |
| 5,508,053 | A | * | 4/1996 | Villota et al. | 426/557 |
| 5,517,905 | A | | 5/1996 | Manser et al. | |
| 6,210,735 | B1 | | 4/2001 | Fukuyama | |
| 2009/0011099 | A1 | | 1/2009 | Kim et al. | |

FOREIGN PATENT DOCUMENTS

| CN | 1057945 A | 1/1992 |
| CN | 114113 A | 1/1997 |
| CN | 101288446 A | 10/2008 |
| CN | 101632395 A | 1/2010 |
| CN | 101971946 A | 2/2011 |
| EP | 0 322 053 A1 | 6/1989 |
| EP | 0 518 097 A1 | 12/1992 |
| EP | 0 738 474 A2 | 10/1996 |
| EP | 0 738 474 A3 | 10/1996 |
| EP | 2 110 026 A1 | 10/2009 |
| EP | 2 687 105 A1 | 1/2014 |
| FR | 2 515 932 A1 | 5/1983 |
| GB | 2 066 040 A | 7/1981 |
| JP | 56 78571 | 6/1981 |
| JP | 58 216655 | 12/1983 |
| JP | 59 95854 | 6/1984 |
| JP | 59 183666 | 10/1984 |
| JP | 1-265858 A | 10/1989 |
| JP | 6 90693 | 4/1994 |
| JP | 7 59179 | 6/1995 |
| JP | 9-191844 A | 7/1997 |
| JP | 2001 149030 | 6/2001 |
| WO | WO 2010/116254 A1 | 10/2010 |

OTHER PUBLICATIONS

International Search Report Issued Jun. 19, 2012 in PCT/JP12/056619 Filed Mar. 15, 2012.
Extended Search Report issued Sep. 9, 2014 in European Patent Application No. 12757641.1.
Combined Office Action and Search Report issued Apr. 11, 2014 in Chinese Patent Application No. 201280013260.1 with English translation of categories of documents.
Information Statement issued Sep. 15, 2015 in Japanese patent application No. 2013-504763 (with English Translation).
Japanese Office Action issued Nov. 10, 2015 in Patent Application No. 2013-504763 (with English Translation).
James E. Kruger et al., "HT and THT Technology", Pasta and Noodle Technology, 1996, pp. 66-69.
"Introduction to Pasta", Knowledge of Foods Mini-Books Series, Aug. 22, 2000, 17 pages (pp. 30-36 and 68-82) (with Partial English Translation).
Official Notification issued Japanese Patent Application No. 2013-504763 dated Mar. 15, 2016 with an Information Disclosure Statement filed by an anonymous third party on Feb. 10, 2016 (with English Translation).
Pasta Technology Today (Issued 1991), p. 156-157.

* cited by examiner

Primary Examiner — Lien T Tran
(74) Attorney, Agent, or Firm — Oblon, McClelland, Maier & Neustadt, L.L.P.

(57) ABSTRACT

Provided is dried pasta having no or very little cracking and a manufacturing method therefor. The method for manufacturing dried pasta comprises a drying step of drying pasta noodle strands to reach the percentage of water content of 14% or less under an environment maintained at a temperature of 75 to 95° C. and humidity of 60 to 90%; a heating step of heating, after the drying step, the pasta noodle strands for 10 to 120 minutes under an environment maintained at a temperature lower by at least 15° C. than the temperature in the drying step and within a range of 50 to 80° C., and humidity of 60 to 90%; and a cooling step of cooling, after the heating step, the pasta noodle strands for 10 to 60 minutes under an environment maintained at a temperature of 20 to 40° C. and humidity of 40 to 80%.

9 Claims, No Drawings

DRIED PASTA MANUFACTURING METHOD

This application is a National Stage of PCT/JP12/056619 filed Mar. 15, 2012 and claims the benefit of JP 2011-056361 filed Mar. 15, 2011.

TECHNICAL FIELD

The present invention relates to a method for manufacturing dried pasta having no cracking.

BACKGROUND ART

Dried pastas which have cracking or deformation are not visually beautiful, and the commercial value is drastically impaired. Particularly in the case of long pasta such as spaghetti, cracking is likely to cause damage such as breakage and chipping of pasta. Therefore, prevention of cracking is important.

Cracking is primarily attributable to uneven drying in a drying step. In view of this, conventionally, a method for preventing cracking or stabilizing a shape of dried pasta by eliminating uneven drying of pasta has been proposed.

For example, Patent Literature 1 describes a method for stabilizing the shape of pasta, comprising increasing the percentage of water content of pasta by 0.1 to 2% by adding water to the surface of the pasta before final drying in the step of drying the pasta, and immediately thereafter, decreasing temperature of the pasta. Patent Literature 2 describes a method for improving the quality of dried pastas, comprising maintaining dried pastas in an atmosphere at 50 to 95° C. Patent Literature 3 describes a method for drying pasta, comprising the steps of processing fresh pasta with saturated vapor at 75 to 80° C. and drying the fresh pasta at a temperature of 50 to 60° C. until the percentage of water content of 11 to 12% is reached.

However, in the case of the method of Patent Literature 1, controlling the water content of pasta by addition of water is difficult. Also, the actual situation is that fully satisfactory results have not been achieved with other methods as well in respect of prevention of cracking.

CITATION LIST

Patent Literature

[Patent Literature 1] JP-B-07-059179
[Patent Literature 2] JP-A-2001-149030
[Patent Literature 3] JP-A-06-090693

SUMMARY OF INVENTION

The present invention provides a method for manufacturing dried pasta, comprising a drying step of drying pasta noodle strands to reach the percentage of water content of 14% or less under an environment maintained at a temperature of 75 to 95° C. and humidity of 60 to 90%; a heating step of heating, after the drying step, the pasta noodle strands for 10 to 120 minutes under an environment maintained at a temperature lower by at least 15° C. than the temperature in the drying step and within a range of 50 to 80° C., and humidity of 60 to 90%; and a cooling step of cooling, after the heating step, the pasta noodle strands for 10 to 60 minutes under an environment maintained at a temperature of 20 to 40° C. and humidity of 40 to 80%.

The present invention also provides a method for manufacturing dried pasta, comprising a drying step of drying pasta noodle strands to reach the percentage of water content of 14% or less under an environment maintained at a temperature of 75 to 95° C. and humidity of 60 to 90%; a cooling step of cooling, after the drying step, the pasta noodle strands for 10 to 60 minutes under an environment maintained at a temperature of 20 to 40° C. and humidity of 40 to 80%; and a heating step of heating, after the cooling step, the pasta noodle strands for 10 to 120 minutes under an environment maintained at a temperature lower by at least 15° C. than the temperature in the drying step and within a range of 50 to 80° C., and humidity of 60 to 90%.

DESCRIPTION OF EMBODIMENTS

An object of the present invention is to provide a method for manufacturing dried pasta having no or very little cracking.

The present inventor conducted intensive research in order to achieve the aforementioned object. As a result, they found that dried pasta having no or very little cracking can be obtained by performing a drying step of drying pasta noodle strands at high temperature and high humidity, and successively performing a heating step of heating the pasta noodle strands at temperature lower by at least 15° C. than the temperature in the drying step, and subsequently performing a cooling step of cooling the pasta noodle strands, or performing the cooling step subsequent to the drying step, and then performing the heating step, thereby completing the present invention.

The present invention can provide dried pasta having no or very little cracking, which is free from the risk of damage such as breakage or chipping of pasta, and moreover, is visually beautiful.

In the method for manufacturing dried pasta of the present invention, the pasta noodle strands may be one which is manufactured by a common method using durum wheat as a raw material. No particular limitation is imposed on the durum wheat, and publicly known durum wheat can be used.

No particular limitation is imposed on the pasta noodle strands as long as they are a long pasta, and examples thereof may include all sorts of long pastas such as spaghetti, spaghettini, fedelini, capellini, tagliatelle, fettucine, and linguine. In regard to a diameter before drying, pasta which is 1 mm to 2.5 mm thick is preferable, and pasta which is approximately 1.4 to 1.8 mm thick in diameter is more preferable. It is to be noted that in the present specification, the diameter of noodle strands or thickness of noodle strands refers to the maximum length in the width direction of the cross-sectional surface of the noodle strands.

The aforementioned pasta noodle strands can be manufactured by a commonly performed extrusion method. For example, the aforementioned pasta noodle strands can be manufactured by the following steps. To durum wheat, water, preferably warm water of 30 to 40° C. is added in an amount of 23 to 30% by weight relative to the durum wheat, followed by mixing. Upon completion of the mixing, the resulting dough is sent to a vacuum mixer, where it is deaerated and compressed while kneading under a reduced pressure of approximately 600±100 mmHg. Subsequently, the dough is sent to a die under a high pressure of around 80 kg/cm². The dough sent to the die is extruded from holes in the die and molded into pasta of desired shape.

The pasta noodle strands manufactured by extrusion molding by the steps shown above are then subjected to the drying step according to the method of the present invention. Before being subjected to the drying step, the diameter of the pasta noodle strands may be 1 mm to 2.5 mm, preferably approximately 1.4 to 1.8 mm, and the percentage of water content thereof may be approximately 20 to 35% by mass, preferably approximately 26 to 30% by mass.

It is to be noted that in the present specification, the percentage of water content of the pasta noodle strands refers to a value obtained by measuring the percentage of water content of the whole part of pasta in accordance with, for example, an oven-drying method (a method involving heating to 130° C. and measuring the change in weight).

According to one aspect of the method for manufacturing dried pasta of the present invention, first of all, the aforementioned pasta noodle strands are subjected to the drying step. In the drying step, the pasta noodle strands are dried under an environment maintained at a temperature of 75 to 95° C., preferably 80 to 90° C. At this time, humidity (relative humidity according to JIS Z8806, the same will apply hereinbelow in the present specification) may be 60 to 90%, preferably 70 to 80%. In this drying step, the pasta noodle strands are dried to reach the percentage of water content of 14% by mass or less, preferably 12% by mass or less.

Subsequently, the resulting pasta noodle strands are transferred to an environment maintained at a temperature lower by at least 15° C. than the temperature in the aforementioned drying step and within a range of 50 to 80° C., and then subjected to the heating step under the aforementioned environment. Preferably, the pasta noodle strands are transferred to an environment maintained at a temperature lower by at least 20° C. than the temperature in the aforementioned drying step and within a range of 50 to 75° C., and then subjected to the heating step under the aforementioned environment.

The temperature change occurring during transfer from the aforementioned drying step to this heating step is preferably 1° C./minute.

The humidity in the heating step may be 60 to 90%, preferably 70 to 80%, and the heating time may be 10 to 120 minutes, preferably 30 to 90 minutes.

After the heating step, the aforementioned pasta noodle strands are transferred to an environment maintained at a temperature of 20 to 40° C., preferably 20 to 35° C., and subsequently subjected to the cooling step under this environment.

The temperature change occurring during transfer from the aforementioned heating step to this cooling step is preferably 1° C./minute.

The humidity in the cooling step may be 40 to 80%, preferably 60 to 70%, and the cooling time may be 10 to 60 minutes, preferably 15 to 30 minutes.

According to another aspect of the method for manufacturing dried pasta of the present invention, first of all, the aforementioned pasta noodle strands are subjected to the drying step under the aforementioned conditions, and subsequently the resulting pasta noodle strands are subjected to the cooling step under the aforementioned conditions, and then to the heating step under the aforementioned conditions. The temperature change occurring during transfer from the cooling step to the heating step is preferably 1° C./minute.

Further, it is preferable to subject the pasta noodle strands having been subjected to the above heating step to the cooling step once again. The conditions applied to the second round of the cooling step are similar to those applied to the aforementioned first round of the cooling step.

The percentage of water content of the dried pasta manufactured by the aforementioned method for manufacturing dried pasta of the present invention may be approximately 14 to 10% by mass, preferably approximately 12 to 11% by mass.

In the method for manufacturing dried pasta of the present invention, the aforementioned drying, heating, and cooling steps can each be performed using an instrument which has been conventionally used for drying or cooling of pasta, for example an instrument capable of maintaining the temperature and humidity at a constant level such as a constant temperature dryer.

In the method for manufacturing dried pasta of the present invention, other steps can be appropriately performed as needed before the drying step or after the cooling step or heating step.

The dried pasta obtained by the manufacturing method of the present invention has no or very little cracking, and thus is free from the risk of damage such as breakage or chipping of pasta, and moreover, has beautiful appearance. Accordingly, the present invention can provide high quality dried pasta with high commercial value.

EXAMPLES

Hereinbelow, the present invention will be described further in detail with reference to Examples. However, the present invention is not limited only to these Examples.

It is to be noted that hereinbelow the conditions of temperature and humidity will indicate average temperature and humidity in each step, and a temperature fluctuation of approximately ±2° C. and a humidity fluctuation of approximately ±1% are acceptable.

Reference Example 1

Manufacture of Pasta Noodle Strands

To 5 kg of durum wheat, 1.4 kg of warm water of 30° C. was added, followed by mixing. The resulting dough was sent to a vacuum mixer, where it was compressed under a reduced pressure of 600 mmHg while kneading. Subsequently, the dough was extruded from a die at a pressure of 80 kg/cm$^2$, whereby pasta noodle strands having a diameter of 1.6 mm and a length of 250 mm were manufactured (percentage of water content, 28% by mass).

Example 1

Four kilograms of the pasta noodle strands manufactured in Reference Example 1 were dried under the conditions of 80° C. at a humidity of 70% to obtain pasta with the percentage of water content of 12% by mass. Subsequently, the resulting pasta was heated under the conditions of 60° C. at a humidity of 70% for 60 minutes, and then cooled under the conditions of 30° C. at a humidity of 70% for 30 minutes to obtain dried pasta (percentage of water content, 12% by mass).

Example 2

Four kilograms of the pasta noodle strands manufactured in Reference Example 1 were dried under the conditions of 80° C. at a humidity of 70% to obtain pasta with the percentage of water content of 12% by mass. Subsequently, the resulting pasta was cooled under the conditions of 30° C. at a humidity of 70% for 30 minutes, and then heated under the conditions of 60° C. at a humidity of 70% for 60 minutes to obtain dried pasta (percentage of water content, 12% by mass).

Comparative Example 1

Four kilograms of the pasta noodle strands manufactured in Reference Example 1 were dried under the conditions of 80° C. at a humidity of 70% to obtain pasta with the percentage of water content of 12% by mass. Subsequently, the pasta was cooled under the conditions of 30° C. at a humidity of 70% for 30 minutes to obtain dried pasta (percentage of water content, 12% by mass).

Comparative Example 2

Four kilograms of the pasta noodle strands manufactured in Reference Example 1 were dried under the conditions of 80° C. at a humidity of 70% to obtain pasta with the percentage of water content of 12% by mass. Subsequently, the resulting pasta was heated under the conditions of 70° C. at a humidity of 70% for 60 minutes, and then cooled under the conditions of 30° C. at a humidity of 70% for 30 minutes to obtain dried pasta (percentage of water content, 12% by mass).

Test Example 1

Cracking in the dried pastas of Examples 1 to 2 and Comparative Examples 1 to 2 was visually evaluated and assessment was made based on the following assessment criteria. The results are shown in Table 1.

Assessment Criteria

A: In 1000 pasta noodle strands, white turbidity (cracking) of 1 mm or longer was not confirmed at all (percentage of cracking, 0%).

B: In 1000 pasta noodle strands, white turbidity (cracking) of 1 mm or longer was confirmed at a very small ratio (percentage of cracking, less than 0.5%).

C: In 1000 pasta noodle strands, a large quantity of white turbidity (cracking) of 1 mm or longer was confirmed (percentage of cracking, 0.5% or more).

TABLE 1

| Sample | Example 1 | Example 2 | Comparative Example 1 | Comparative Example 2 |
|---|---|---|---|---|
| Step | Drying step Temperature 80° C. Humidity 70% (Percentage of water content, 12% by mass) ↓ Heating step Temperature 60° C. Humidity 70% ↓ Cooling step Temperature 30° C. Humidity 70% (Percentage of water content, 12% by mass) | Drying step Temperature 80° C. Humidity 70% (Percentage of water content, 12% by mass) ↓ Cooling step Temperature 30° C. Humidity 70% ↓ Heating step Temperature 60° C. Humidity 70% (Percentage of water content, 12% by mass) | Drying step Temperature 80° C. Humidity 70% (Percentage of water content, 12% by mass) ↓ Cooling step Temperature 30° C. Humidity 70% (Percentage of water content, 12% by mass) | Drying step Temperature 80° C. Humidity 70% (Percentage of water content, 12% by mass) ↓ Heating step Temperature 70° C. Humidity 70% ↓ Cooling step Temperature 30° C. Humidity 70% (Percentage of water content, 12% by mass) |
| Assessment | A | A | C | C |

Test Example 2

Effects of Temperature Conditions in the Heating Step

From the pasta noodle strands manufactured in Reference Example 1, dried pasta was manufactured by similar steps to those in Example 1 excluding under the temperature and humidity conditions shown in the following Table 2. Cracking in the resulting dried pasta was assessed based on similar assessment criteria to those in Test Example 1. The results are shown in Table 2.

TABLE 2

| | Sample | | | | | | | | |
|---|---|---|---|---|---|---|---|---|---|
| | Sample 1 | Sample 2 | Sample 3 | Sample 4 | Sample 5 | Sample 6 | Sample 7 | Sample 8 | Sample 9 |
| Drying step | | | | | | | | | |
| Temperature (° C.) | 80 | 80 | 80 | 80 | 80 | 80 | 95 | 80 | 80 |
| Humidity (%) | 70 | 75 | 80 | 70 | 75 | 80 | 80 | 80 | 80 |
| ↓ | | | | | | | | | |

TABLE 2-continued

| | | | | | | | | | |
|---|---|---|---|---|---|---|---|---|---|
| Heating step | | | | | | | | | |
| Temperature (° C.) | — | — | — | 50 | 60 | 65 | 80 | 70 | 75 |
| Humidity (%) | — | — | — | 70 | 70 | 70 | 70 | 70 | 70 |
| ↓ | | | | | | | | | |
| Cooling step | | | | | | | | | |
| Temperature (° C.) | 30 | 30 | 30 | 30 | 30 | 30 | 30 | 30 | 30 |
| Humidity (%) | 70 | 70 | 70 | 70 | 70 | 70 | 70 | 70 | 70 |
| ↓ | | | | | | | | | |
| Heating step | | | | | | | | | |
| Temperature (° C.) | — | — | — | — | — | — | — | — | — |
| Humidity (%) | — | — | — | — | — | — | — | — | — |
| ↓ | | | | | | | | | |
| Cooling step | | | | | | | | | |
| Temperature (° C.) | — | — | — | — | — | — | — | — | — |
| Humidity (%) | — | — | — | — | — | — | — | — | — |
| Assessment | C | C | C | B | A | B | B | C | C |

| | Sample | | | | | |
|---|---|---|---|---|---|---|
| | Sample 10 | Sample 11 | Sample 12 | Sample 13 | Sample 14 | Sample 15 |
| Drying step | | | | | | |
| Temperature (° C.) | 80 | 80 | 80 | 95 | 80 | 80 |
| Humidity (%) | 70 | 75 | 80 | 80 | 80 | 75 |
| ↓ | | | | | | |
| Heating step | | | | | | |
| Temperature (° C.) | — | — | — | — | — | — |
| Humidity (%) | — | — | — | — | — | — |
| ↓ | | | | | | |
| Cooling step | | | | | | |
| Temperature (° C.) | 30 | 30 | 30 | 30 | 30 | 30 |
| Humidity (%) | 70 | 70 | 70 | 70 | 70 | 70 |
| ↓ | | | | | | |
| Heating step | | | | | | |
| Temperature (° C.) | 50 | 60 | 65 | 80 | 70 | 75 |
| Humidity (%) | 70 | 70 | 70 | 70 | 70 | 70 |
| ↓ | | | | | | |
| Cooling step | | | | | | |
| Temperature (° C.) | 30 | 30 | 30 | 30 | 30 | 30 |
| Humidity (%) | 70 | 70 | 70 | 70 | 70 | 70 |
| Assessment | B | A | B | B | C | C |

Test Example 3

Effects of Heating Time in the Heating Step

From the pasta noodle strands manufactured in Reference Example 1, dried pasta was manufactured by similar steps to those in Example 1 excluding under the conditions shown in the following Table 3. Cracking in the resulting dried pasta was assessed based on similar assessment criteria to those in Test Example 1. The results are shown in Table 3.

TABLE 3

| | Sample | | | | | | | |
|---|---|---|---|---|---|---|---|---|
| | Sample 14 | Sample 15 | Sample 16 | Sample 17 | Sample 18 | Sample 19 | Sample 20 | Sample 21 |
| Drying step | | | | | | | | |
| Temperature (° C.) | 80 | 80 | 80 | 80 | 80 | 80 | 80 | 80 |
| Humidity (%) | 70 | 75 | 80 | 80 | 70 | 75 | 80 | 80 |
| ↓ | | | | | | | | |

TABLE 3-continued

| | Sample | | | | | | | |
|---|---|---|---|---|---|---|---|---|
| | Sample 14 | Sample 15 | Sample 16 | Sample 17 | Sample 18 | Sample 19 | Sample 20 | Sample 21 |
| Heating step | | | | | | | | |
| Temperature (° C.) | 60 | 60 | 60 | 60 | — | — | — | — |
| Humidity (%) | 70 | 70 | 70 | 70 | — | — | — | — |
| Heating time (min) | 10 | 30 | 60 | 120 | — | — | — | — |
| ↓ | | | | | | | | |
| Cooling step | | | | | | | | |
| Temperature (° C.) | 30 | 30 | 30 | 30 | 30 | 30 | 30 | 30 |
| Humidity (%) | 70 | 70 | 70 | 70 | 70 | 70 | 70 | 70 |
| ↓ | | | | | | | | |
| Heating step | | | | | | | | |
| Temperature (° C.) | — | — | — | — | 60 | 60 | 60 | 60 |
| Humidity (%) | — | — | — | — | 70 | 70 | 70 | 70 |
| Heating time (min) | — | — | — | — | 10 | 30 | 60 | 120 |
| ↓ | | | | | | | | |
| Cooling step | | | | | | | | |
| Temperature (° C.) | — | — | — | — | 30 | 30 | 30 | 30 |
| Humidity (%) | — | — | — | — | 70 | 70 | 70 | 70 |
| Assessment | B | B | A | A | B | B | A | A |

The invention claimed is:

1. A method for manufacturing dried long pasta, the method comprising:
    extruding a pasta dough to yield long pasta strands having a water content of 26 to 35% by mass,
    drying the extruded long pasta strands having a water content of 26 to 35% by mass to reach a percentage of water content of 14% or less under an environment maintained at a temperature of from 75 to 95° C. and a humidity of from 70 to 80%;
    heating, after the drying, the long pasta strands for 10 to 120 minutes under an environment maintained at a temperature at least 15° C. lower than the temperature in the drying and within a range of from 50 to 80° C., and a humidity of from 70 to 80%; and
    cooling, after the heating, the long pasta strands for 10 to 60 minutes under an environment maintained at a temperature of from 20 to 40° C. and a humidity of from 40 to 80%.

2. A method for manufacturing dried long pasta, the method comprising:
    extruding a pasta dough to yield long pasta strands having a water content of 26 to 35% by mass,
    drying the extruded long pasta strands having a water content of 26 to 35% by mass to reach a percentage of water content of 14% or less under an environment maintained at a temperature of from 75 to 95° C. and a humidity of from 70 to 80%;
    cooling, after the drying, the long pasta strands for 10 to 60 minutes under an environment maintained at a temperature of from 20 to 40° C. and a humidity of from 40 to 80%; and
    heating, after the cooling, the long pasta strands for 10 to 120 minutes under an environment maintained at a temperature at least 15° C. lower than the temperature in the drying and within a range of from 50 to 80° C., and a humidity of 70 to 80%.

3. The method according to claim 2, further comprising:
    cooling, after the heating, the long pasta strands for 10 to 60 minutes under an environment maintained at a temperature of from 20 to 40° C. and a humidity of from 40 to 80%.

4. The method according to claim 1, wherein a diameter of the long pasta strands before the drying is from 1 mm to 2.5 mm.

5. The method according to claim 2, wherein a diameter of the pasta strands before the drying is from 1 mm to 2.5 mm.

6. The method according to claim 3, wherein a diameter of the long pasta strands before the drying is from 1 mm to 2.5 mm.

7. The method according to claim 1, comprising drying long pasta strands to reach a percentage of water content of 12% less.

8. The method according to claim 2 comprising drying long pasta strands to reach a percentage of water content of 12% or less.

9. The method according to claim 1, comprising drying long pasta strands at a temperature of from 80 to 90° C.

* * * * *